(12) United States Patent
Wu

(10) Patent No.: US 7,444,315 B2
(45) Date of Patent: Oct. 28, 2008

(54) VIRTUAL COMMUNITY GENERATION

(75) Inventor: Yuh-Cherng Wu, San Jose, CA (US)

(73) Assignee: SAP Aktiengesellschaft, Walldorf ( * ) Notice: Subject to any disclaimer, the term of this patent is extended or adjusted under 35 U.S.C. 154(b) by 343 days.

(21) Appl. No.: 10/917,957

(22) Filed: Aug. 12, 2004

(65) Prior Publication Data

US 2006/0036456 A1 Feb. 16, 2006

(51) Int. Cl.
G06F 17/00 (2006.01)
G06N 5/02 (2006.01)

(52) U.S. Cl. ....................................................... 706/50
(58) Field of Classification Search .................... 706/50
See application file for complete search history.

(56) References Cited

U.S. PATENT DOCUMENTS

| | | | | |
|---|---|---|---|---|
| 5,862,223 | A * | 1/1999 | Walker et al. ................ | 705/50 |
| 6,230,287 | B1 | 5/2001 | Pinard et al. | |
| 6,606,744 | B1 * | 8/2003 | Mikurak ..................... | 717/174 |
| 6,629,018 | B2 * | 9/2003 | Mondie et al. .............. | 700/228 |
| 6,629,081 | B1 * | 9/2003 | Cornelius et al. ........... | 705/30 |
| 6,671,818 | B1 * | 12/2003 | Mikurak ....................... | 714/4 |
| 6,697,824 | B1 * | 2/2004 | Bowman-Amuah ........ | 709/229 |
| 6,721,713 | B1 * | 4/2004 | Guheen et al. ................ | 705/1 |
| 6,842,737 | B1 * | 1/2005 | Stiles et al. .................. | 705/6 |
| 6,850,252 | B1 * | 2/2005 | Hoffberg ................... | 715/716 |
| 6,904,449 | B1 * | 6/2005 | Quinones .................. | 709/203 |
| 6,957,186 | B1 * | 10/2005 | Guheen et al. ................ | 705/1 |
| 7,069,234 | B1 * | 6/2006 | Cornelius et al. ........... | 705/26 |
| 7,069,300 | B2 * | 6/2006 | Toyota et al. ............... | 709/206 |
| 7,099,727 | B2 * | 8/2006 | Wu et al. .................... | 700/104 |
| 7,124,101 | B1 * | 10/2006 | Mikurak ..................... | 705/35 |
| 7,130,807 | B1 * | 10/2006 | Mikurak ....................... | 705/7 |
| 7,133,834 | B1 * | 11/2006 | Abelow ...................... | 705/10 |
| 7,136,791 | B2 * | 11/2006 | Darwent et al. ................ | 703/6 |
| 7,143,054 | B2 * | 11/2006 | Doherty ...................... | 705/10 |
| 7,149,698 | B2 * | 12/2006 | Guheen et al. ................ | 705/1 |
| 7,149,724 | B1 * | 12/2006 | Flanagan et al. ............. | 705/80 |
| 7,159,178 | B2 * | 1/2007 | Vogt et al. .................. | 715/733 |
| 7,162,458 | B1 * | 1/2007 | Flanagan et al. ............. | 705/80 |
| 7,165,041 | B1 * | 1/2007 | Guheen et al. ............... | 705/26 |

(Continued)

OTHER PUBLICATIONS

Social profiles of virtual communities Hummel, J.; Lechner, U.; System Sciences, 2002. HICSS. Proceedings of the 35th Annual Hawaii International Conference on Jan. 7-10, 2002, pp. 2245-2254.*

(Continued)

Primary Examiner—Michael B. Holmes
(74) Attorney, Agent, or Firm—Fish & Richardson P.C.

(57) ABSTRACT

A knowledge system includes one or more repositories with information for one or more topics, problems, and solutions to problems. A method to gather information for a virtual community of experts to address a problem area includes identifying the problem area, and searching for a virtual community within a master knowledge repository that is relevant to the problem area. The master knowledge repository includes information for one or more virtual communities. If the relevant virtual community is not found, the method includes creating information for the virtual community that is relevant to the problem area by associating information for one or more experts of the problem area to the virtual community, and creating a profile for each of the experts based on the associated information.

18 Claims, 9 Drawing Sheets

U.S. PATENT DOCUMENTS

| | | | | |
|---|---|---|---|---|
| 7,167,844 | B1* | 1/2007 | Leong et al. | 705/80 |
| 7,194,442 | B1* | 3/2007 | Flanagan et al. | 705/80 |
| 7,222,078 | B2* | 5/2007 | Abelow | 705/1 |
| 7,225,177 | B2* | 5/2007 | Wu et al. | 706/48 |
| 7,231,384 | B2* | 6/2007 | Wu et al. | 707/3 |
| 7,269,568 | B2* | 9/2007 | Stiles et al. | 705/5 |
| 7,310,625 | B2* | 12/2007 | Wu | 706/50 |
| 7,315,826 | B1* | 1/2008 | Guheen et al. | 705/7 |
| 7,337,158 | B2* | 2/2008 | Fratkina et al. | 706/45 |
| 2001/0047270 | A1 | 11/2001 | Gusick et al. | |
| 2003/0140037 | A1* | 7/2003 | Deh-Lee | 707/3 |
| 2004/0083213 | A1 | 4/2004 | Wu et al. | |

OTHER PUBLICATIONS

Making community work aware Kolvenbach, S.; Grather, W.; Klockner, K.; Parallel, Distributed and Network-Based Processing, 2004. Proceedings. 12th Euromicro Conference on Feb. 11-13, 2004, pp. 358-363 Digital Object Identifier 10.1109/EMPDP.2004. 1271466.* eTV: a mixed reality interface onto Inhabited TV Morphett, J.; Jessop, M.; IEE Colloquium on Virtual Reality Personal Mobile and Practical Applications—98/454 Oct. 28, 1998 pp. 1/1-1/5.*

Virtual collaboration spaces: the EVE community Bouras, C.; Giannaka, E.; Tsiatsos, T.; Applications and the Internet, 2003. Proceedings. 2003 Symposium on Jan. 27-31, 2003, pp. 48-55.*

Towards an evaluation methodology for the development of research-oriented virtual communities Ho, J.; Chignell, M.; Enabling Technologies: Infrastructure for Collaborative Enterprises, 2000. (Wet Ice 2000). Proceedings. IEEE 9th International Workshops on Jun. 14-16, 2000, pp. 112-117 Digital Object Identifier 10.1109/ENABL. 2000.883714.*

Collaboration platforms for virtual student communities Schubert, P.; Koch, M.; System Sciences, 2003. Proceedings of the 36th Annual Hawaii International Conference on Jan. 6-9, 2003 p. 10 pp. Digital Object Identifier 10.1109/HICSS.2003.1174571.*

Social profiles of virtual communities Hummel, J.; Lechner, U.; System Sciences, 2002. HICSS. Proceedings of the 35th Annual Hawaii International Conference on Jan. 7-10, 2002 pp. 2245-2254.*

Making community work aware Kolvenbach, S.; Grather, W.; Klockner, K.; Parallel, Distributed and Network-Based Processing, 2004. Proceedings. 12th Euromicro Conference on Feb. 11-13, 2004, pp. 358-363 Digital Object Identifier 10.1109/EMPDP.2004. 1271466.*

Towards an evaluation methodology for the development of research-oriented virtual communities Ho, J.; Chignell, M.; Enabling Technologies: Infrastructure for Collaborative Enterprises, 2000. (Wet Ice 2000). Proceedings. IEEE 9th International Workshops on Jun. 14-16, 2000, pp. 112-117 Digital Object Identifier 10.1109/ENABL. 2000.883714.*

Collaboration platforms for virtual student communities Schubert, P.; Koch, M.; System Sciences, 2003. Proceedings of the 36th Annual Hawaii International Conference on Jan. 6-9, 2003 p. 10 pp. Digital Object Identifier 10.1109/HICSS.2003.1174571.* eTV: a mixed reality interface onto Inhabited TV Morphett, J.; Jessop, M.; IEE Colloquium on Virtual Reality Personal Mobile and Practical Applications—98/454 Oct. 28, 1998 pp. 1/1-1/5.*

Virtual collaboration spaces: the EVE community Bouras, C.; Giannaka, E.; Tsiatsos, T.; Applications and the Internet, 2003. Proceedings. 2003 Symposium on Jan. 27-31, 2003, pp. 48-55.*

Collaboration platforms for virtual student communities Schubert, P.; Koch, M.; System Sciences, 2003. Proceedings of the 36th Annual Hawaii International Conference on Jan. 6-9, 2003 p. 10 pp. Digital Object Identifier 10.1109/HICSS.2003.1174571.*

Trust-aware cooperation Despotovic, Z.; Aberer, K.; Hauswirth, M.; Distributed Computing Systems Workshops, 2002. Proceedings. 22nd International Conference on Jul. 2-5, 2002 pp. 408-409 Digital Object Identifier 10.1109/ICDCSW.2002. 1030804.*

Probst et al., "Managing Knowledge, Building Blocks for Success", John Wiley & Sons, LTD, 1998.

Schreiber et al., "Knowledge Engineering and Management, The CommonKADS Methodology", Massachusetts Institute of Technology, 2000.

Staab et al., "Knowledge Processes and Ontologies", IEEE Intelligent Systems, 2001, pp. 26-34.

Nonaka et al., "The Knowledge-Creating Company", How Japanese Companies Create the Dynamics of Innovation, Oxford University Press, 1995.

Thomas R. Gruber, "A Translation Approach to Portable Ontology Specifications", Academic Press Limited, 1993, pp. 199-220.

Davenport et al., "Working Knowledge, How Organizations Manage What They Know", Harvard Business School Press, 1998.

Edvinsson et al., "Intellectual Capital, Realizing Your Company's True Value by Finding Its Hidden Brainpower", Harper Business, 1997.

Office Action, U.S. Appl. No. 10/918,219, dated Sep. 4, 2007, 10 pages.

Screenath (an online article "RE: Anybody Knows any Expert Locator Tool", Nov. 2003), http://www.brint.com/wwwboard/messages/131717.html, 2 pages.

XpertSHARE ("Comprehensive Features & Benefits", Dec. 2003, 1 page.

* cited by examiner

VIRTUAL COMMUNITY GENERATION

CROSS-REFERENCE TO CO-PENDING APPLICATIONS

This application is a co-pending application with U.S. patent application Ser. No. 10/918,219, filed Aug. 12, 2004 and U.S. patent application Ser. No. 10/917,956, filed Aug. 12, 2004.

TECHNICAL FIELD

The following description relates to a knowledge base for solving problems.

BACKGROUND

In enterprise systems, one or more users can interact with a base system to perform a number or interactions. The base system may have information to help the users in their work tasks. For example, the user may be an engineer who performs service calls for a number of customers with equipment that have service contracts. The engineer may have a level of expertise in servicing certain types of equipment and may be able to help less-experienced engineers in solving their servicing problems. The experienced engineer may contact the base system for customer information and timing issues related to repairs. However, the less-experienced engineers may need to contact the base system more often for more substantive issues, such as the best approaches on how to service the equipment, and how to tackle problems encountered in their work assignments.

SUMMARY

The present application describes systems and techniques relating to collecting and forming information for a virtual community of experts to solve a problem and/or address a topic. One implementation described here includes a computer program product tangibly embodied in an information carrier that has instructions that perform a method to associate information for a virtual community of experts who are capable of solving the problem. The method involves creating a profile for an expert, in which the profile includes information associated with an experience, a quality of work, and an efficiency of the expert. The method includes matching the expert profile with information associated with the virtual community, in which the matching is based upon the problem to be solved. The method also includes associating the expert profile with the information for the virtual community, and storing the information for the virtual community in a knowledge repository.

Also described is an implementation for a system to generate information for a virtual community of experts for solving a problem. The system has a knowledge network that is based on the problem and includes information associated with the virtual community. The virtual community has information for one or more experts to solve the problem. The system includes a server with a knowledge manager and a knowledge repository. The knowledge manager interacts with the knowledge repository to locate an expert, and the knowledge repository stores information for the knowledge network. The system also includes information to be updated for the knowledge network by assigning information associated with the located expert with the information for the virtual community. The knowledge repository stores the updated knowledge network information.

Another implementation involves a method to gather information for a virtual community of experts to address a problem area that includes identifying the problem area, and searching for a virtual community within a master knowledge repository that is relevant to the problem area. The master knowledge repository includes information for one or more virtual communities. If the relevant virtual community is not found, the method includes creating information for the virtual community that is relevant to the problem area by associating information for one or more experts of the problem area to the virtual community, and creating a profile for each of the experts based on the associated information.

The systems and techniques described here may provide one or more of the following advantages. For example, the system provides a collaborative environment to increase the efficiency of users of the system. The system can identify experts and self-organize experts for certain problems or topics into groups or virtual communities based on a criteria of the expert, such as experience, quality of work, and performance. Knowledge networks and virtual communities for the problems or topics can be created based on information that is resident within the system, and information derived from one or more mobile devices and/or external applications. The information can be accessed by multiple users, including the users of the mobile devices and/or external applications.

One or more users of mobile devices or applications external to an enterprise server can better identify and contact experts to help solve problems. Efficiency may be increased because the problems may be solved collaboratively among a team of experts. Experts can be identified at run-time based on one or more criteria of the experts or users. Users of the system can be better connected to information, and the information can be dynamically updated by any of the users to increase the overall knowledge of the system. In one implementation, the problems may be answered at run-time based on problems that have been previously solved and stored in a master knowledge repository, so experts may not have to be contacted to address the problem.

In another aspect, information for a knowledge network can be broadcasted to those associated with the knowledge network when new information is available and the knowledge base has been updated with the new information. The multiple users may be users of mobiles devices or external applications with local knowledge repositories that can be updated with information from the master knowledge repository.

As another benefit, the master knowledge repository can record the habits, characteristics, and communications of the multiple users of the systems. In this aspect, a knowledge base can be created or updated that includes information for which the users may be identified as experts for certain topics. The recorded habits, characteristics, and communications can be collected and organized in a profile for each of the users. The characteristics can include work histories, experiences, and evaluations of work performance and quality of work.

Efficiency may also be increased by reducing the learning curve for less-experienced employees. The less-experienced employee can use a local knowledge repository on a client device to find information and experts to solve one or more problems. With the virtual community contact information provided at run-time, the experienced engineers may be able to help the less-experienced employee while pointing to other problem-solving approaches residing in the master knowledge repository, or from their own knowledge and experiences.

Details of one or more implementations are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

Figure 1A:
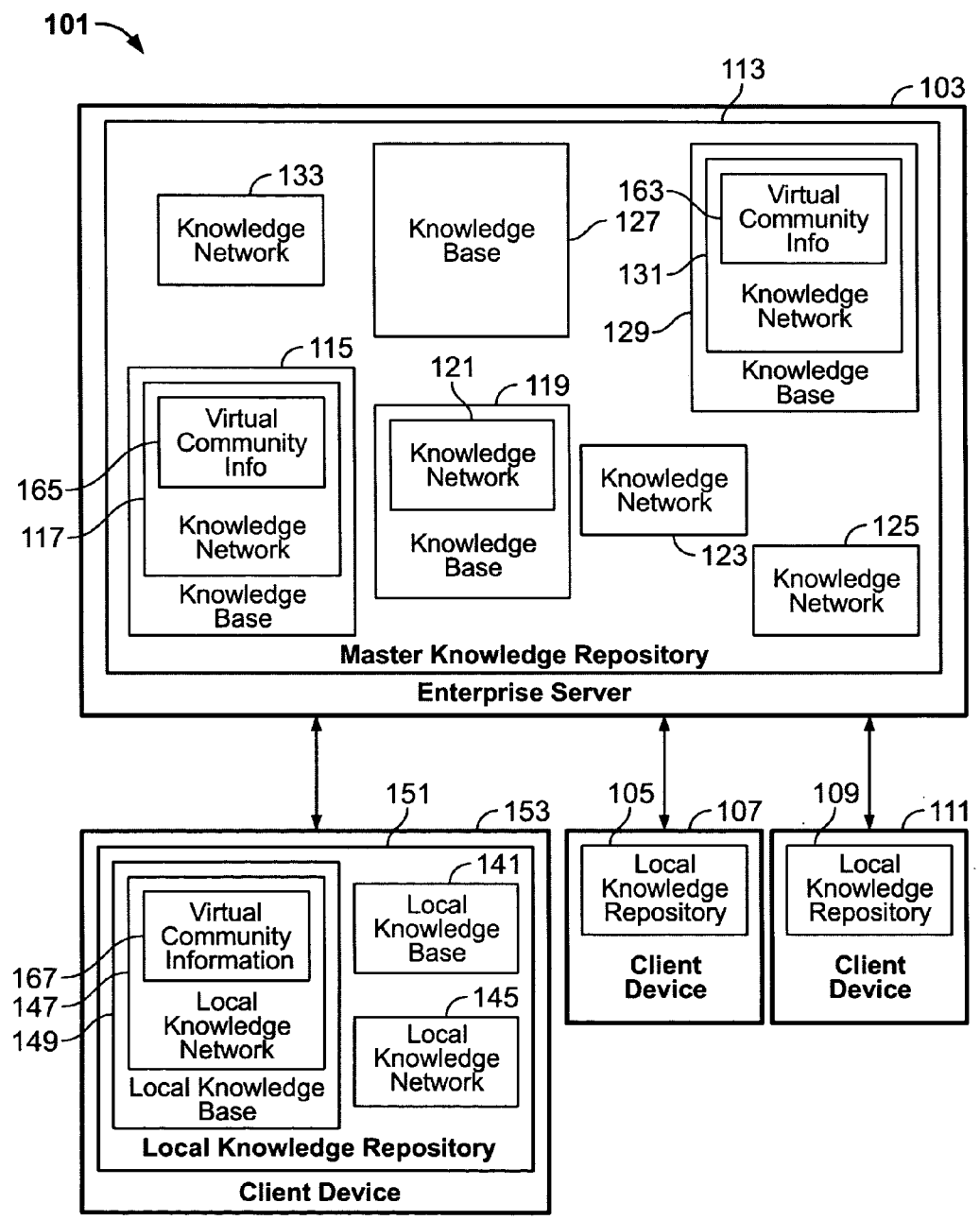
FIG. 1A illustrates an arrangement of virtual communities, knowledge networks, knowledge bases, and knowledge repositories among an enterprise server and multiple client devices.

FIG. 1A shows an exemplary block diagram of components of a knowledge-based system 101 in relation to multiple system users. The system users may have various roles in a business organization, and the users may use client devices 107, 111, 153 that interact with an enterprise server 153. The system 101 can create one or more knowledge networks 117, 121, 123, 125, 131, 133, 145, 147 to solve one or more problems. Each of the knowledge networks may include information for a "virtual community" 165, 163, 167 of experts who are capable of solving a problem. Multiple knowledge networks 117, 121, 123, 125, 133, 131 can be stored in a master knowledge repository 113 on the enterprise server 103, and run-time searches can be conducted among the various knowledge networks 117, 121, 123, 125, 133, 131 to find one or more experts who can solve the problem.

A knowledge base may refer to a collection of domain knowledge or information about a business operation or a business process. The content of the knowledge base can include structured (e.g., attributes/hierarchical attributes), unstructured information (e.g., natural language or procedural codes), or other knowledge representations, such as logic and rules. A knowledge network may refer to a structured representation for an individual's association with a domain of knowledge and the related communications or exchanges of the domain of knowledge among other individuals. A knowledge network can describe the persons associated with the domain knowledge, and how the knowledge is used in an organization. For example, a call center agent can have a domain of knowledge associated with handling customer problems. The domain of knowledge for the knowledge network can relate to solving a problem or topic. The knowledge network can grow and evolve with information collected during business operations. A knowledge network 133 may or may not be part of a knowledge base, and a knowledge base 127 may or may not include a knowledge network.

The information for the knowledge network can be stored in a set of database tables and/or searchable indexes. The set of database tables can be used to describe the knowledge networks, nodes, linked among nodes, profiles of each individual (a set of database to represent structured information and free text as unstructured information). Information can be stored in conventional database tables for structured information, and in documents for unstructured information. The information can also be compiled into searchable indexes.

A request may be submitted by a user of a client device (e.g., 107) to an enterprise server 103 for information on one or more experts who can solve the problem or question. The client device may be a mobile device, such as telephone, PDA (Personal Digital Assistant), wireless handheld, etc. The experts may be identified based on one or more characteristics of the experts, such as experience, quality of work, and performance of work. The request may also be sent by a user of an application that is external to the enterprise server 103.

The enterprise server 103 may have a master knowledge repository 113 that interacts with a local knowledge repository 151, 105, 109 residing in each mobile device 153, 107, 111. The master knowledge repository 131 can hold various types of data and information on the enterprise server 103. For example, the master knowledge repository 131 can store one or more knowledge bases 115, 119, 127, 129, knowledge networks 117, 121, 123, 125, 127, 131, 133, and other types of data (e.g., 165). The information stored in the master knowledge repository 131 can relate to a solution database, service orders, sales contracts, product information, and documents.

The local knowledge repositories 151, 105, 109 can store information and data that is similar to the master knowledge repository 113. Because the client devices 107, 111, 153 may have less storage capacity than the enterprise server 103 the amount of information stored on each of the client devices is less. In one aspect, the client devices may store only the relevant knowledge or information that is related to the user of the device. As a result, a client device 153 may have a fewer local knowledge bases 141, 149 and networks 145, 147 than the master knowledge repository. The relevant knowledge may be retrieved from the master knowledge repository 113 and copied on the local knowledge repository. Alternatively, the local knowledge repository 151 may send new or different information to the master knowledge repository 113 for duplication of information on the master knowledge repository 113. The local knowledge repository 151 may also store other information, such as database tables and files for user personalization information.

The local knowledge bases 141, 149 can interactively adapt and increase the information stored in the one or more knowledge bases (e.g., 115) in the master knowledge repository 113. Mobile device users can prompt for answers to questions while they are out in the field, and receive information 165, 163 from the enterprise server 103 for one or more experts in a virtual community who can answer their questions. The virtual community information 165 in a knowledge network 117 in the enterprise server 103 may be duplicated on a client device 153. The virtual community information 165 may have information for a profile of each of the experts as well as the communications and relationships of the experts within the virtual community and/or the company. The profile for the expert may include the experience of the expert, evaluations of the expert work performance and history, the contact information for the expert, notable work contributions of the experts, the role of the expert in an organization, and other attributes of the expert.

Information for an expert may be listed in more than one knowledge network. For example, a sales representative may be considered an expert for a knowledge network related to sales contracts, and may also be an expert for a knowledge network related to product information. In another example, a sales representative may be listed based on relationships within a knowledge network. For instance, the sales representative may have been a previous supervisor for a call center agent. If the call center agent is considered an expert within a knowledge network, the previous supervisory status of the sales representative may be listed in an evaluation of the call center agent within the knowledge network information.

In another implementation, a knowledge network may include multiple virtual communities. For example, a knowledge network may relate to customer communication with call center agents. The knowledge network may have a first virtual community for call center agents working with the sale of a product, a second virtual community for call center agents working with the technical support for the product, and a third virtual community for non-technical customer support, such as returning merchandise.

Figure 1B:
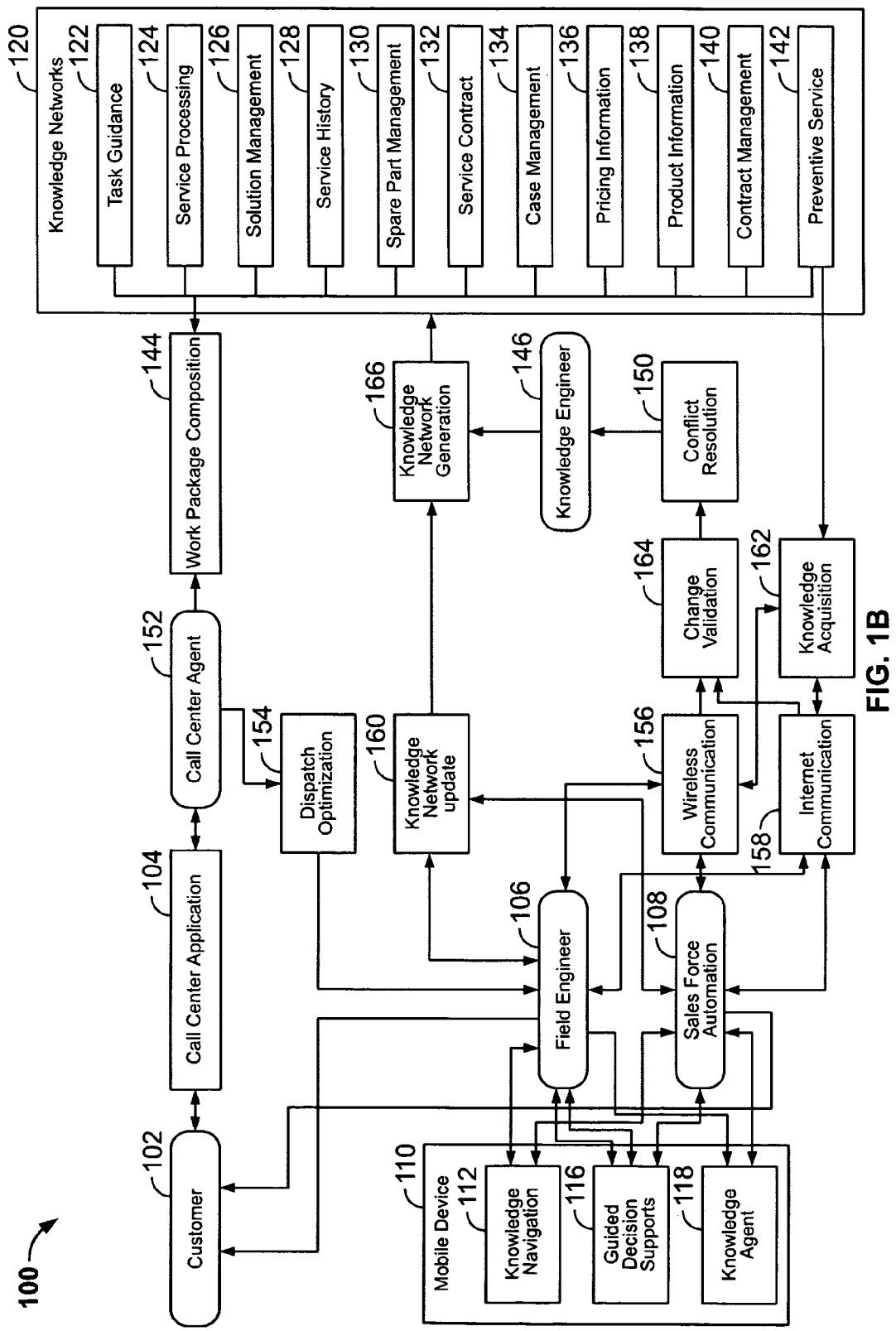
FIG. 1B shows a diagram that illustrates a knowledge system with multiple knowledge networks.

FIG. 1B illustrates a knowledge system 100. The system 100 described may include a self-organized collaborative network in which information is organized based on one or more criteria for one or more experts. For example, the system 100 may organize information based on a problem defined by a mobile device user. The self-organized collaborative network may identify one or more experts who may be able to solve or answer the problem, and create information for a virtual community of experts. The virtual community of experts may be able to collaboratively solve the problem. Experts within the virtual community may be organized based on one or more criteria, such as their experience level, their profile in an organization, and/or their quality of work. The virtual community of experts can be included as part of a knowledge network for the problem or topic. The self-organized collaborative knowledge network can use the information that has been identified and categorized and make that information available to other users or other systems based on particular problems and/or requests.

In FIG. 1B, a knowledge engineer 146 generates a number of knowledge networks 120 based on one or more problems or topics. For example, the knowledge networks 120 can include a task guidance network 122 to provide information about a particular procedure for making a repair to an item. The task guidance network 122 could provide a script to a call center agent 152 to read to a potential customer to help the agent follow a particular business process, and/or provide answers to questions. A service history network 122 may be used for providing information for particular items that have been serviced. A solution management network 126 can be used to find solutions where the agent 152 is trying to find specific answers to problems that have been identified by customers. The problems might have been previously answered and archived by other call center agents. Other knowledge networks can include a spare parts management network 130, a service contracts network 132, a case management network 134, a pricing information network 136, a product information network 138, a contract management network 140, and a preventive service network 142. The knowledge networks 120 may be stored in a master knowledge repository in an enterprise server, and may be part of a knowledge base in the master knowledge repository. Knowledge networks 120 may be generated by a knowledge network generator module 166 and updated with a knowledge network update module 160. A knowledge engineer 146 may contribute information in generating a knowledge network. For example, a knowledge engineer 146 may locate and select relevant company presentations and awards to associate with one or more experts.

The system 100 can connect a customer 102 to a call center application 104, and in some cases, a field engineer 106 and/or a sales force automation module 108. The sales force automation module 108 may provide one or more automated processes to facilitate a sales order or transaction. The system can connect a mobile device 110 with the field engineer 106 or sales force automation module 108 and, through a wireless communication connection 156 and/or an internet communication connection 158, the mobile device 110 can interact with one or more knowledge bases in the enterprise server to acquire knowledge (block 162) and/or change knowledge (block 164). The mobile device 110 may synchronize with the enterprise server through, for example, a wireless connection or a wired connection using a personal computer.

The mobile device 110 may host one or more modules to facilitate problem-solving and knowledge management. For example, a knowledge navigation module 112 may provide a graphical user interface (GUI) for a user to enter information, perform a search, and view results. A guided decision support module 116 may be a rule-based module to assist in the search of the solution based on one or more recommended or commonly-guided solutions for particular problems. The knowledge agent module 118 may facilitate interactions with the master knowledge repository on the enterprise server.

The call center application 104 may be an interaction center for the call center agent 152 who is working with the customer to search for a solution to a problem using the master knowledge repository. The call center application 104 can provide customer interactions through one or more communication mediums, such as an email, a telephone call, or a chat management system.

The system 100 may also have the ability to resolve conflicts. For example, the system may resolve conflicts between two different users who are trying to update information in the master knowledge repository in conflicting ways. The system 100 can use a rules-based engine with various criteria to determine which changes to make, if any. In one implementation, the nature of the change may depend on the characteristics of the users who are making the change on their own mobile devices. For example, the nature of the change may depend on an evaluation of the user's experience level in an organization or in a technical area.

In another implementation, two or more mobile devices may be used in the system, and the system can use and a conflict resolution module 150 to resolve conflicts for the mobile devices. The conflict resolution module 150 may identify one or more conflicting additions or modifications made by mobile device users. A knowledge engineer 146 can resolve the conflict for one or more knowledge networks. In another implementation, the conflicts resolution module 150 uses one or more rules to resolve conflicts for additions and/or changes made by one or more users of the system.

The system may identify experts to solve the problem, categorize those experts in a virtual community, and facilitate the collaboration of the experts of knowledge network to solve the problem. The system may facilitate the collaboration of the experts to solve the problem. The system may also have a knowledge elicitation engine to conduct run-time searches of one or more knowledge networks to locate experts based on the problem. The search may be based on one or more rules that relate to one or more characteristics of the experts in the respective knowledge network. When experts for a problem are located in one or more knowledge networks, the information can be packaged (block 144) in a format to represent the relevant information, and optimized to be dispatched (block 154) to a field engineer 106 that uses the mobile device 110.

Figure 2:
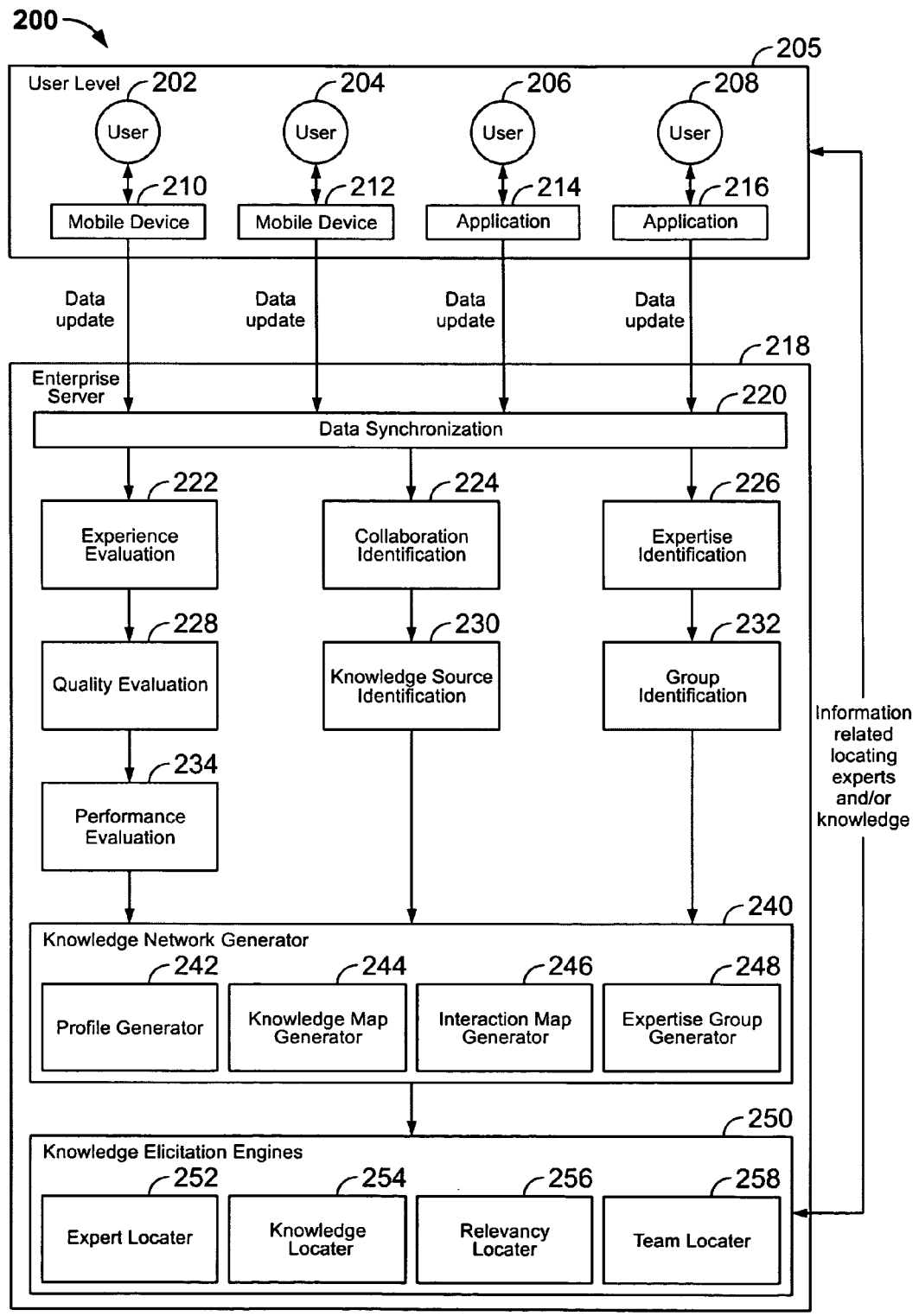
FIG. 2 shows an exemplary block diagram for creating, updating, and searching a knowledge network.

FIG. 2 is an exemplary block diagram for a system 200 for knowledge networks. In creating a knowledge network for a problem, one or more experts are identified to form the virtual community that can solve the problem. In one implementation, the disclosed system 200 can include a host or enterprise server with a master knowledge repository. The master knowledge repository can include any type of knowledge base, such as a solution database or service-order database, and may include multiple types of different knowledge bases. The master knowledge repository can also include multiple knowledge networks. The knowledge networks may or may not be part of a knowledge base.

The system 200 may include one or more mobile devices 210, 212 and/or client applications 214, 216 that have the capability of having their own (local) resident knowledge repositories with local knowledge bases and/or knowledge networks. The one or more one or more mobile devices 210, 212 and/or client applications 214, 216 are at a user level 205. The local knowledge bases and networks may be downloaded or copied from an enterprise server hosting the master knowledge repository. The knowledge base on each of the mobile devices 210, 212 may be locally modified by the users of the devices, for example, when the users are out in the field and entering information into their mobile device. The mobile devices and their local knowledge bases and knowledge networks can be used to dynamically improve the format, organization, and/or content of the knowledge bases and knowledge networks in the enterprise server over time. The enterprise server 218 can receive input for the stored knowledge bases from multiple mobile devices and client applications. Accordingly, the multiple mobile devices and client applications can download information from the master knowledge repository.

In one implementation, the system 200 may have one or more mobile devices for one or more mobile device users. For example, the mobile device users may be service-based employees who perform a number of service transactions, such as servicing computers, appliances, refrigerators, and heating systems. The mobile device, for example, may include handheld devices, such as personal digital assistants (PDAs), telephones, or wireless handheld devices, which provide information about the types of products that are being serviced, and may have information from the master knowledge repository, such as information on a prior service history of the customers being serviced.

In one implementation, the mobile devices may not be permanently or continuously connected to the host server or enterprise server, but may be operating offline. When a mobile device comes online or reconnects with the enterprise server, there may be a synchronization process that occurs (e.g., using data synchronization 220), when information stored within the mobile device's local knowledge repository can be provided to the enterprise server, and when the information on the enterprise server can also be downloaded to the mobile device. For example, information about a new product may be provided to a mobile device, and a new problem that was not previously captured in the master knowledge repository may be reported to the enterprise server. The information on the mobile device's local knowledge repository can be uploaded to the enterprise server, and the enterprise server can then decide whether or not to update the master knowledge repository. If the master knowledge repository is updated, the updated information can be distributed to other mobile devices to provide those mobile devices with the updated information that came from the original mobile device. In this aspect, the information from one mobile device can be broadcasted to other mobile devices. The system may have a knowledge transporter module or data synchronization module 220 to synchronize the data flow between the mobile devices and the enterprise server. So, one or more service technicians may have updated information when the information is available from the enterprise server using information obtained from any of the other mobile devices. Over time, the information in the master knowledge repository can be improved and modified to include the latest and most relevant information for one or more service people.

There may be cases where the enterprise server 218 does not update the master knowledge repository with information or does not inform other mobile devices of specific changes that one user has incorporated into their mobile device. In that case, there may not be a broadcasting of information. One such might occur if the enterprise server decides that user that has changed information on their own mobile device and the user is not proficiently experienced to be changing that type of information, or may be changing information that should not be broadcasted to the other mobile devices. For example, the information may be confidential or highly-sensitive. The enterprise server may have a decision model that can make a determination to update and/or broadcast information. In another example, the enterprise server 218 may be able to determine if the information from the mobile device is important information based on the type or level of the user of the mobile device. A senior field engineer, for example, may have more important information to send when compared to a junior field engineer.

In FIG. 2, two users 202, 204 are on mobile devices 210, 212 and two users 206, 208 are on applications 214, 216, such as call center applications. Users 206, 208 may be connected through the internet or intranet, but not a mobile device. In one example, the experts may be call center agents, in which the call center agents may have become experts for a particular type of problem in their interactions with customers. In another example, experts may be performing service calls in a service field or area. The field experts may be using mobile devices to remain in contact with information from the enterprise server 218. The enterprise server 218 may have an ability to identify information and experts in both of those exemplary type of environments, and make that information available to other systems and users.

In one implementation, the enterprise server 218 includes knowledge evaluators 222, 228, 234, knowledge identifiers 224, 230, 226, 232, and generators 240 to generate knowledge and create knowledge networks. The knowledge network can include information and expertise for a problem or topic with virtual communities of experts and profiles of the experts within the virtual communities.

A data synchronization module 220 assists in synchronizing information between the mobile devices 210, 212 and/or the applications 214, 216, and one or more components 222, 224, 226 in the enterprise server 218. The expertise identification module 226 can be a rule-based module that attempts to identify an individual's expertise based on the area of business problems solved by the persons, and the relationships and interactions of those persons in an organization. For example, a rule may qualify an individual's expertise level based on a number of problems resolved per year, or based the average time for the individual to resolve problems in a given area. In another example, a case-based approach may have a set of standard cases to describe different types of expertise. An individual's working experience and/or profile can be compared to those standard cases. The amount of similarity between a standard case and the individual's working experience and/or profile can be used to qualify whether the individual has expertise in a specific area based on the standard case. The group identification module 232 can generate or identify virtual groups of experts by analyzing the similarity of the expertise of various individuals. So, the enterprise server 218 is able to create group designation, for example experts repairing Sony televisions, the group identification module 232 could arrange and create information for a virtual group of experts who have expertise in the problem area. The group identification module 232 may be able to render a pattern to form a subgroup within the group to provide more detailed information to a user. For example, the group identification module 232 may form a subgroup of experts based on their expertise for a certain business unit within an organization, or may group the experts into managers and non-managers. In another example, the subgroups of experts may be generated based on their level of expertise or other demographic factors, such as a particular office location. In one implementation, the groups and subgroups can be represented as a hierarchical structure without overlapped subgroups, so that several subgroups form a single group without sharing members among the subgroups. In another example, one or more groups may be organized based on relationships of the group members.

A collaboration identification module 224 may have one or more tools to recognize collaboration among individuals. In a call center, for example, collaboration can be measured by a number of forwarded problems, in which an amount of problems that are forwarded by a call center agent to a more experienced agent are assessed. In other example, the module 224 may recognize collaboration as email communication among individuals requesting consultation for a problem. In another example, requests and responses from newgroups, discussion forums, references of personal web-pages, or other processes may be recorded and be recognized as collaboration. A knowledge source identification module 230 can identify knowledge that was initially stored in the local knowledge repository of various mobile devices 210, 212 or applications 214, 216. So, if there has been an expert that has been identified, the knowledge source identification module 230 can identify specific types of knowledge from the expert's mobile device and/or application. The information from the knowledge source identification module 230 can be stored into the master knowledge repository of the enterprise server, in particular a knowledge base and/or updated to a knowledge network. In another implementation, the knowledge source identification module 230 can allow a user to locate the source of the information, and allow the user to have information relating to the particular mobile device or application from which the information was derived—so, the module 230 can keep track of where the information has originated.

The system 200 has the ability to identify and store information for experts or problems that are associated with or coming from one or more mobile devices and/or one or more external applications in run-time, or as interactions occur between the enterprise server 218 and the mobile devices and/or applications. An experience evaluation module 222 can identify experts based on an evaluation of a person's experience level with a problem. In another aspect, the experience evaluation module 222 may also create and archive an experience log of the experiences of users of the mobile devices and/or applications. For example, the experience log may include the user commands or requests entered into a mobile device over a time period. The log may be used in creating an experience profile or an experience level for the user. The quality evaluation module 228 can evaluate a quality of the level of knowledge that has been synchronized back with the enterprise server from the mobile device. In one implementation, the quality evaluation module 228 can interact with the experience evaluation module 222 and use one or more rules to evaluate the quality of the information being sent from a mobile device or application based on the experience level of the user of the mobile device. A performance evaluation module 234 can create a performance log and provide an evaluation of the performance of the user of the mobile device or application. For example, the performance evaluation module 234 may contain information or indexes about the user's effectiveness and efficiency in resolving a problem.

The system 200 includes one or more modules 242, 244, 246, 248 to generate information related to a knowledge network. The knowledge network generator 240 may also generate a virtual community of experts for a knowledge network. The profile generator module 242 can generate profiles of the experts, the experience level of the experts, the performance of the experts, and other information about experts, such as contact information for the experts. The profile generator 242 may generate profiles of the users, which can include the experience level of the users, the performance of the users, and other information about users, such as contact information for the users. The knowledge map generator 244 can generate information relating to the identified knowledge sources from the knowledge source identification module 230. The identified knowledge sources can originate from one or more mobile devices and/or applications from multiple users. The knowledge map generator module 244 recognizes the context of the topic or problem area and associates the topic or problem with one or more data sources, solutions, and references. The interaction map generator module 246 identifies the communications that are sent within an organization regarding a topic or a problem and maps the communications to experts. For example, a product support group may have sent advice and advertisements to customers with information for repairing a product. The communications sent from that group may be mapped to the topic or problem area of "repair and maintenance" for the product. The mapped information can be stored in a knowledge network and/or a knowledge base for the topic. An expertise group generator 248 can identify a particular group or a virtual team of experts, collect information from that identified group, and arrange the collected information for the identified group. The expert group generator module 248 can associate the generated profiles into a group profile. The group profile may be used as part of the information for a virtual community. The generators 242, 244, 246, 248 can generate and update information in run-time. The information can be dynamically updated and improved as the enterprise server 218 and related devices 210, 212 acquire more information over time.

The self-organized collaborative network may interact with a run-time knowledge elicitation engine 250 that resides in the enterprise server 218. The knowledge elicitation engine 250 may search for one or more experts to solve the problem and/or address the topic. The search may be conducted to locate in a virtual community to solve the problem. Experts can be identified from the virtual community to solve the problem based on one or more rules for certain criteria, such as their experience level, their profile in an organization, and/or their quality of work. The experts may be identified at "run-time" when a question or problem is presented to the enterprise server. In one implementation, the question or problem is presented to the enterprise server 218 when the mobile device 210, 212 is synchronized with the enterprise server.

A few of the modules 252, 254, 256, 258 that may be in the knowledge elicitation engine 248 are also shown in FIG. 2 to search for experts and virtual communities. The modules 252, 254, 256, 258 can use the information provided by the knowledge network generator 240. One such module is an expert locator 252 that can locate an expert based on the generated information. The expert locator module 252 can use the information from the generator 240, such as the virtual team-generated information and/or the profile information from the profile generator, to locate an expert. The knowledge locator module 254 and the team locator module 258 can also use the information generated from the generator 240 to locate knowledge support information, project teams, organizational information, and employee communications. The knowledge locator module 254 can provide other helpful information to one or more requesting client devices or applications, such as other links, databases, and resources that may help in addressing their request.

The knowledge elicitation engine 250 may be able to identify and categorize various information, such as, sources of information, experts, and specific types of information that are collected in master knowledge repository of the enterprise server. In one example, the run-time knowledge elicitation engine can search and locate a knowledge network based on a request for a problem, as well as an expert within the knowledge network based on the efficiency of the expert. The user requesting information to solve a problem may be matched with someone who is very efficient at working with a certain type of product. The information may be located at run-time and may increase the efficiency of the user requesting the information, as well as the overall efficiency of the services performed for an organization. When the requested information cannot be located by the expert locator module 252 or the knowledge locator module 254, the relevancy locator module 256 may explore relevant information by searching existing information across various knowledge networks for the problem or topic being addressed. For example, the relevancy locator module 254 may attempt to match the content of the request with various knowledge sources in the master knowledge repository, and automatically extend the search to explore indirect or unobvious relationships among experts and knowledge.

The expert locator module 252 may identify and locate an expert from a group of system users based on the experience of the expert. For instance, a highly-experienced service technician in an organization may have 10 or more years of experience, and a lesser-experienced service technician may have 1 or 2 years of experience. The lesser-experienced service technician may be able to benefit from the knowledge of the more experienced technician based upon the information that is collected by the enterprise server over time. The ability to locate the expert may also be useful to the any other technicians using the system if those technicians are in need of information and are unable to contact or identify the expert. A mobile device or an external application may submit a user's request to the enterprise server 218 to identify or locate the expert. For example, the request may be for information for a problem, information for a type of expert, and/or information about a group of experts.

Figure 3:
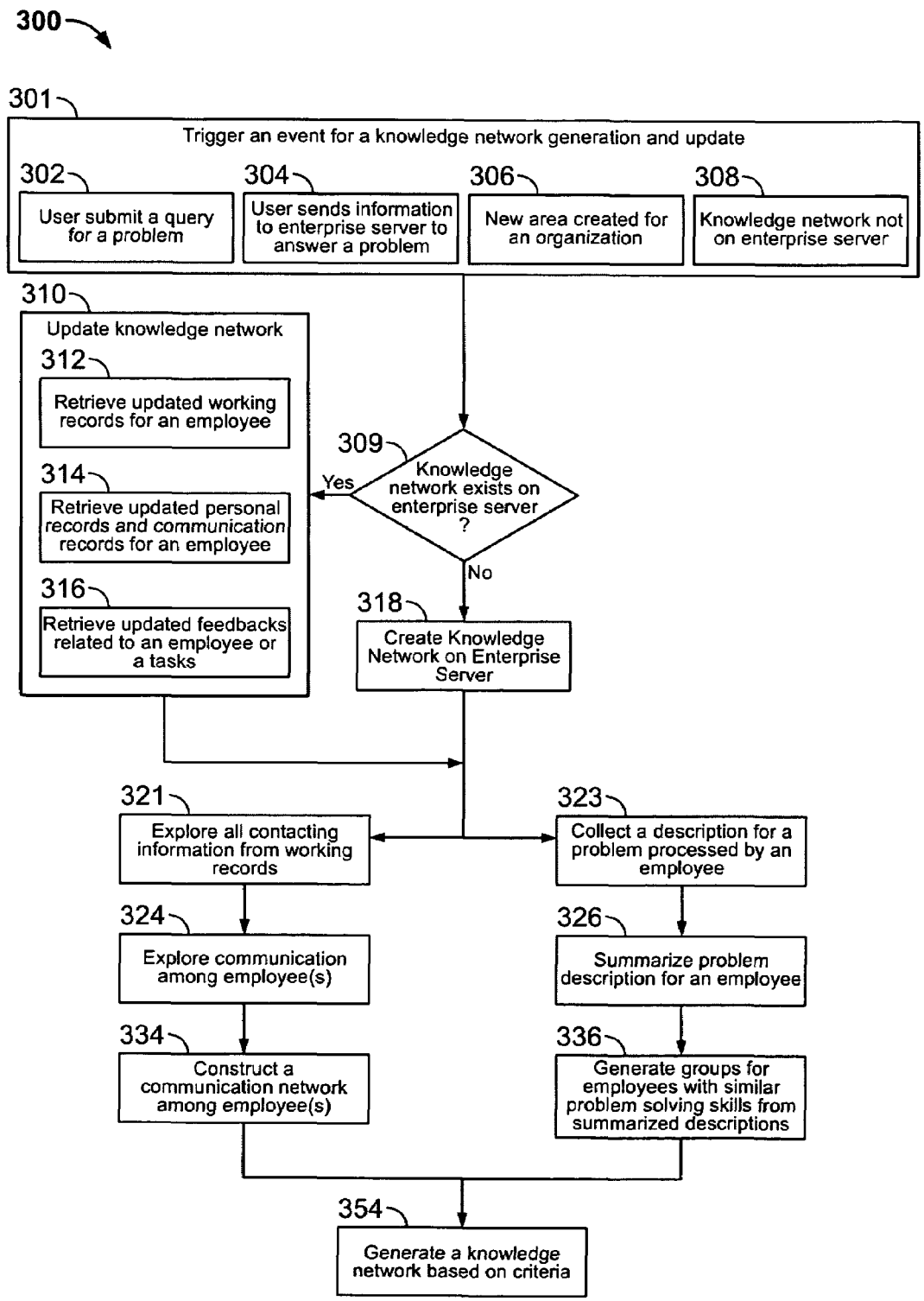
FIG. 3 shows an exemplary flow chart for creating or updating a knowledge network in a collaborative environment.

FIG. 3 shows an exemplary flow chart 300 for creating and/or updating a knowledge network in a collaborative environment. The knowledge network can be created and/or updated based on one or more triggering events (block 301). For example, a user may submit a query to the enterprise server for a problem (block 302). The query may be submitted via a mobile device or an application that is external to the enterprise server. The mobile device or application can interact with the enterprise server by synchronizing information with the enterprise server with a wired or wireless connection. In another example, the user may send information directly to the enterprise server to help answer a problem submitted by another user (block 304). In other cases, an organization may create a new service area for customers, and may need to create a knowledge network for a problem within that new service area (block 306). In another example, a private knowledge network may exist on a client device, but not on the enterprise server (block 308). When a user synchronizes information from the device with the enterprise server, the private knowledge network may be created and uploaded in the master knowledge repository on the enterprise server with the permission from the owner of the private knowledge network. The creating and/or updating of the knowledge network is not limited to the triggering events described (block 301), but may also include other triggering events.

After an event is triggered (block 301), the knowledge network determines whether a knowledge network already exists on the enterprise server (block 309). The knowledge network can include information on experts that can be organized into a virtual community for a problem or topic. If a knowledge network already exists on the enterprise server (block 309) then the knowledge network can be updated with the latest information (block 310). In one implementation, the information may come from one or more other mobile devices or external applications. The information for the knowledge network may also come from other systems and external repositories. In updating the knowledge network, the latest working records for an employee are retrieved (block 312). The personal records and communication records for the employee may also be retrieved (block 314). For example, communication records may be retrieved related to a presentation that the employee has given at a technical conference. Job performance and evaluation information can also be retrieved for the employee (block 316). For example, documented feedback on the employee's skills, tasks, or work assignments may be retrieved. After the knowledge network is updated with the latest information (block 310), new information may be added to the knowledge network (blocks 321, 323), such as adding new members to the virtual community of experts.

If a knowledge network does not exist on the enterprise server for a problem or topic (block 309) then the knowledge network is created in the master knowledge repository on the enterprise server (block 318), and members can be added to the virtual community (blocks 321, 323). In one implementation to identify and add experts to the virtual community, information related to the working records of the employee contact information is investigated (block 321). For example, an employee may have contact information for a certain workgroup or office location that deals with the problem. Communication related to or from the employee may also be investigated (block 324). For example, if an organization has records of communications between employees (e.g., email), certain employees can be identified as an experts who answer most of the questions in a working area or a project. Employees who are identified as potential experts based on contact information and communications can be added in a communication network (block 334), such as a group email list, and added to the knowledge network (block 354).

In another implementation, experts may be identified for the knowledge network based on a collection of descriptions for problems processed by an employee (block 323). For example, a call center agent may have a level of expertise for problems that they have previously answered for customers. Those answers can be summarized for a problem description (block 326), and the employee can be grouped with other employees who have similar problem-solving skills and experience (block 336). So, the identified employees can be added in a knowledge network based on their experience, skills, and expertise.

The knowledge network may include a virtual community with the contact information for each of the experts, a summary of the qualifications of the experts, and a collaborative method of contacting those experts, such as a group email address (e.g., "soldering-tool expert" email list) and/or a head or key contact expert for the virtual community. Each expert may have a profile based on an evaluation of the expert's experience, performance, and/or quality of work. The profile may be listed and distributed to other member's within the expert's virtual community. In some implementations, personalized features can also be included in the profile.

Figure 4:
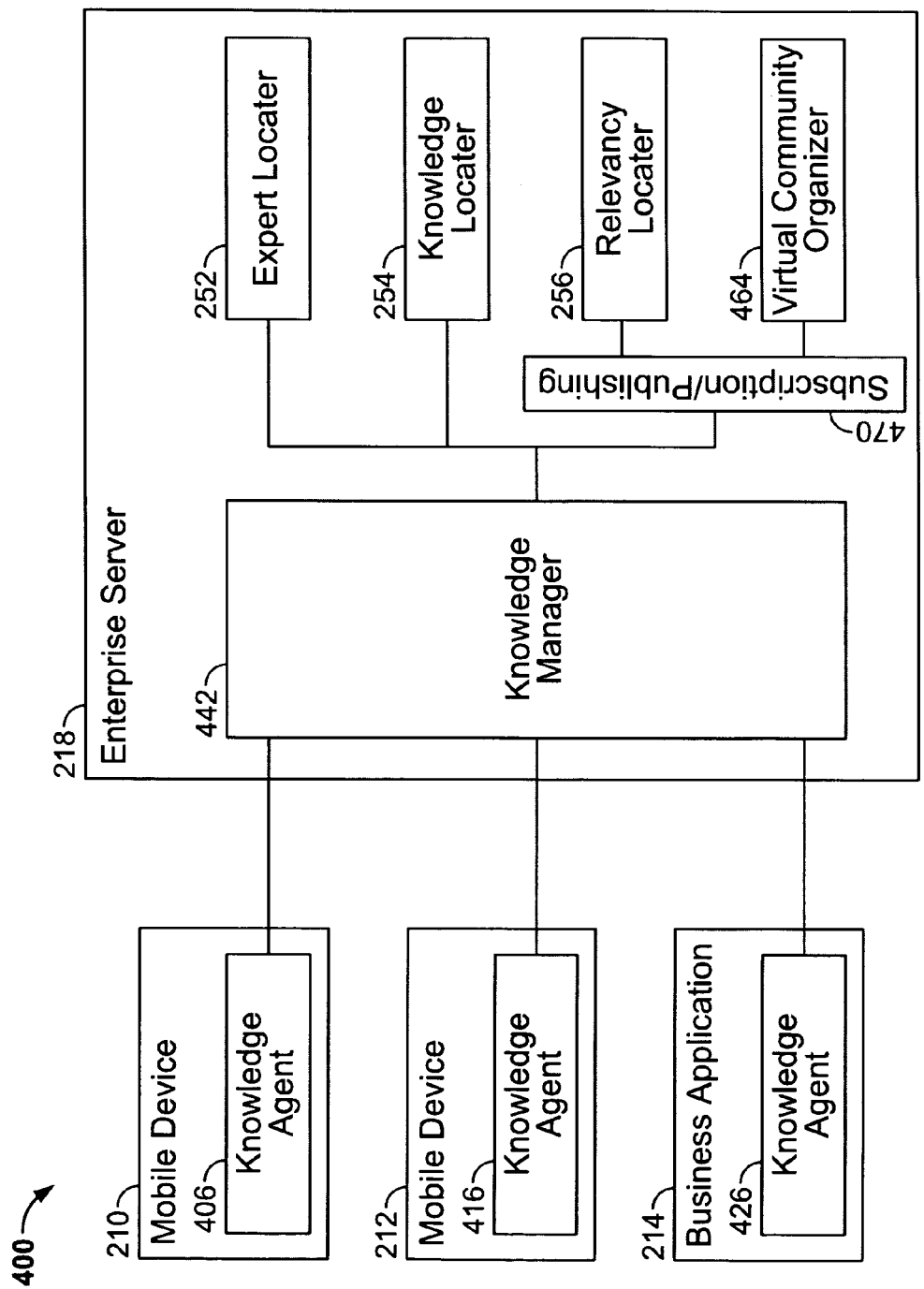
FIG. 4 shows an exemplary block diagram for creating knowledge for the problem.

FIG. 4 shows an exemplary block diagram for creating and/or updating knowledge networks. FIG. 4 shows a couple of mobile devices 210, 212 and a business application 214 that interact with an enterprise server 218. The mobile devices 210, 212 and the business application 214 are external to the enterprise server 218 and interact with the enterprise server using a local knowledge agent 406, 416, 426. The knowledge agent can facilitate interactions with the enterprise server 218 to identify information associated with one or more experts for solving one or more problems. A knowledge manager 442 in the enterprise server 218 facilitates interaction with the knowledge agents 406, 416, 426 and the knowledge resources 252, 254, 256, 470, 464 of the enterprise server 218.

One or more software modules can be used to set up a local knowledge repository on one or more mobile devices. For example, a new mobile device may need to be configured and initially setup with the type of information from the master knowledge repository that is useful for a particular user. In one case, a knowledge assembler module (not shown) can acquire information from the enterprise server 218 and use a portion of the information on the master knowledge repository to setup the local knowledge repository on a mobile device.

In FIG. 4, the system includes a virtual community organizer 464 to form virtual communities of experts based on one or more criteria. The system also has a relevancy locator 256 to locate relevant knowledge and form knowledge networks based on a topic, query, or problem. The relevant knowledge may include problems that have been previously solved by employees, employee communications that addresses the problem, and/or articles, journals, and presentations by one or more employees that relate to the problem. When virtual communities and knowledge networks are formed, the information for the experts' qualifications and experience are published 470 so that the experts can collaboratively solve problems, and users of the mobile devices 210, 212 and application 214 can receive information on experts that can be contacted. The information generated for the virtual community of experts is part of the knowledge network. When new experts are identified for a virtual community, those experts are subscribed to that knowledge network and the published information for the knowledge network can be updated in the master knowledge repository.

In one implementation, the master knowledge repository can synchronously provide users with updated information based on previously requested queries. For example, a user may request information for a product, and the master knowledge repository provides the user with a group of experts for the product. The master knowledge repository can store the identification of users who submit requests and/or receive information for a knowledge network, and send updates to those users when updates occur to the knowledge network. So, if the virtual community adds another expert a week later, for instance, the system can recall that the user was previously provided with information for the virtual community and can provide the user with an update of the virtual community (e.g., update via email). In one implementation, users can be provided with updates several for weeks or months after a previous request until the users elect to limit or terminate the update notices. In the example shown in FIG. 4, the enterprise server may also have an expert locator module 252 to locate experts, and a knowledge locator module 254 as described in relation to FIG. 2.

The system may conduct run-time searches of the master knowledge repository to search for knowledge networks and one or more experts in virtual communities to solve the problem. In one implementation, when the mobile device user or external application user submits a question to the enterprise server, the enterprise server 218 can utilize one or more modules to conduct a run-time search for a knowledge network related to the problem and/or an expert in the virtual community to help to answer the question for the user. When a problem is solved, information for the solution can be stored in the enterprise server to further increase the knowledge of the master knowledge repository, and that knowledge may be provided to other users for future questions.

Figure 5A:
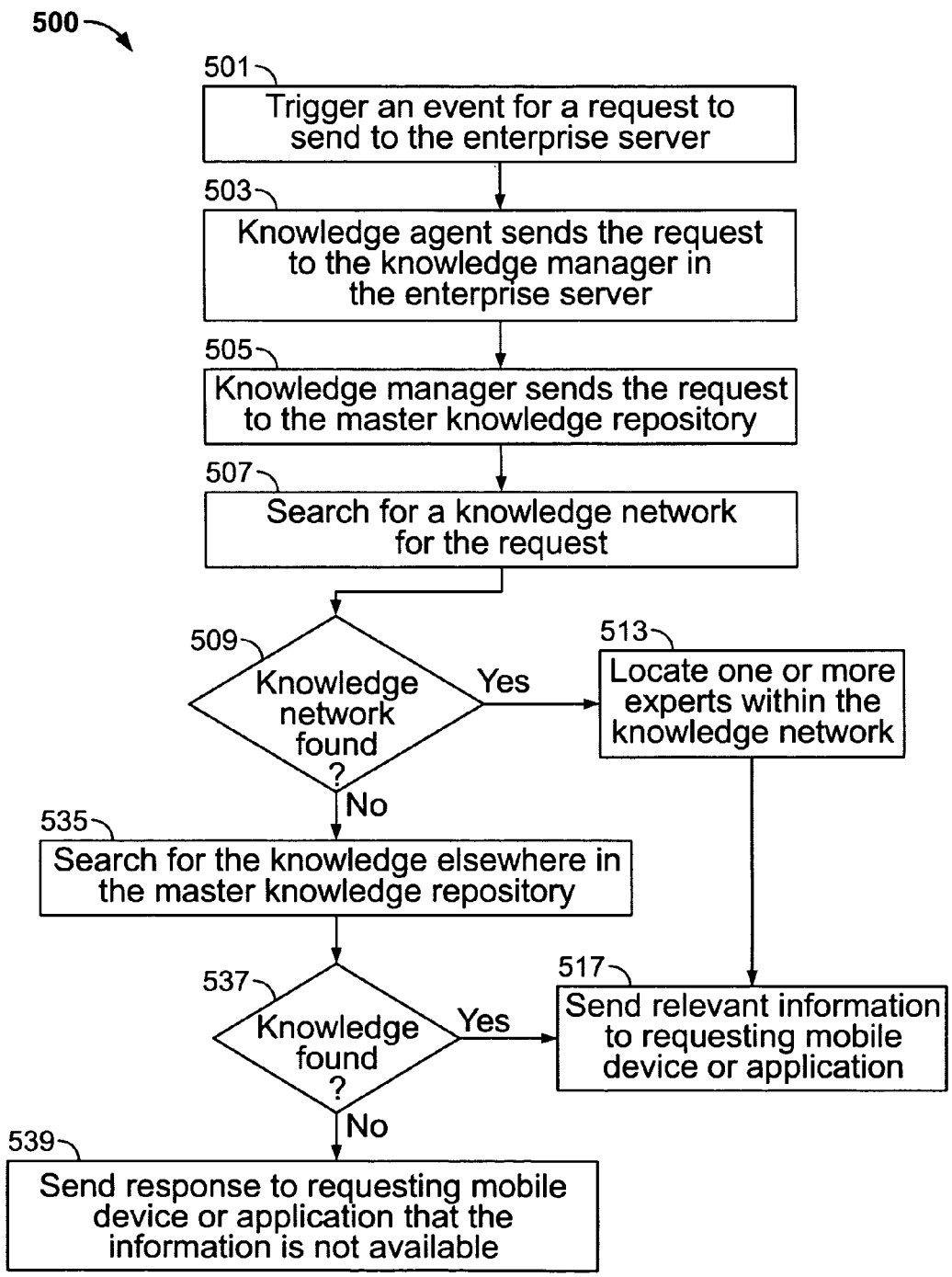
FIG. 5A shows a flow diagram for conducting a search for knowledge for a topic or problem.

FIG. 5A shows a flow diagram 500 for conducting a search for knowledge for a topic or problem. A user can trigger an event to send a request to the enterprise server for information for a topic or problem (block 501). The user may be on an application or a mobile device that is external to the enterprise server. A knowledge agent module resides in the mobile device or application and interacts with a knowledge manager module in the enterprise server to send the request to the enterprise server (block 503). The enterprise server can have a master knowledge repository that can include multiple knowledge networks, with each knowledge network relating to a problem or topic. The knowledge manager sends the request to the master knowledge repository (block 505). A search can be conducted for a knowledge network on the enterprise server to provide a solution the request (block 507). If a relevant knowledge network is located, information for a virtual community within that knowledge network and/or one or more experts within the virtual community is located (block 513), and the requested information is sent to the user (block 517). If the knowledge network is not found (block 509), a search is conducted elsewhere in the master knowledge repository (e.g., a knowledge base) for the knowledge (block 535). If the search locates relevant results (block 537), the information is sent to the requesting mobile device or application (block 517). If the search does not locate relevant results in the master knowledge repository (block 537), a response is sent to the user that the requested information is not available (block 539).

Figure 5B:
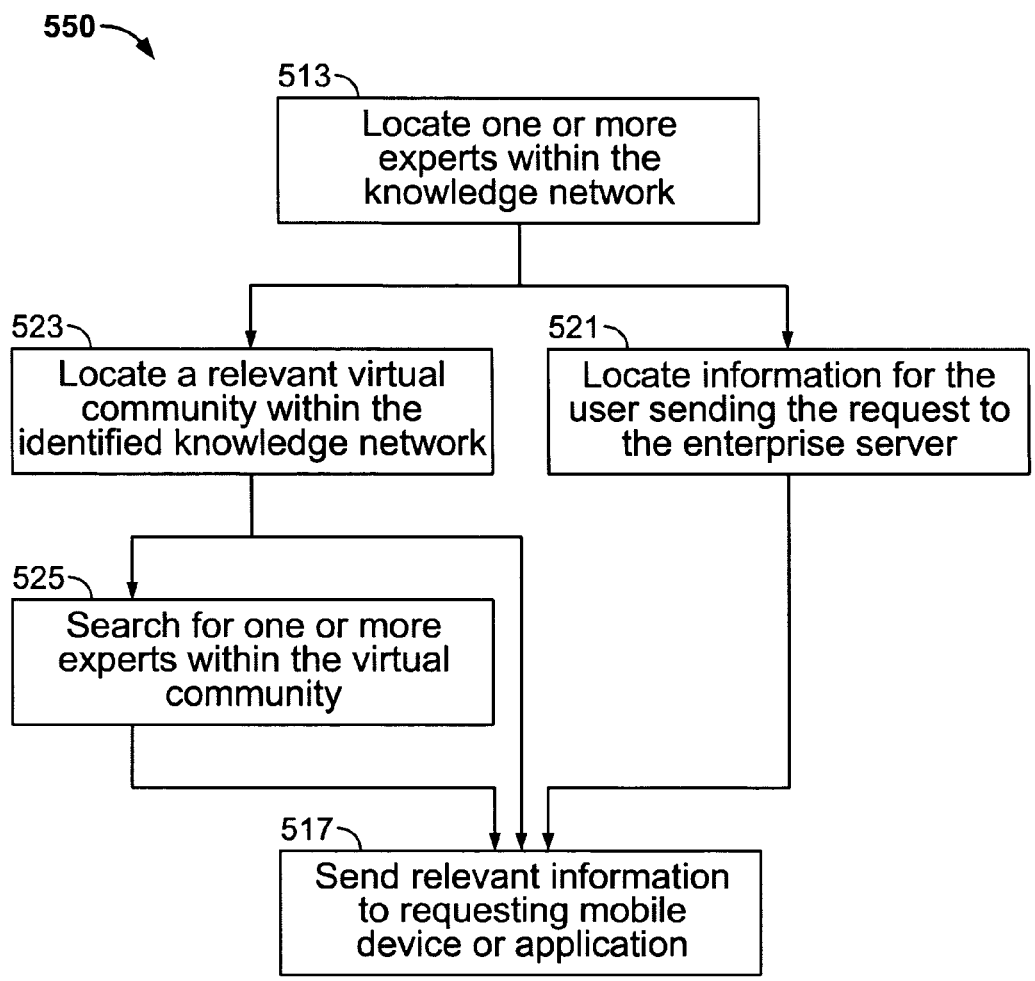
FIG. 5B shows the flow diagram from FIG. 5A for conducting a search for knowledge for a topic or problem.

FIG. 5B shows a flow diagram 550 for conducting a search for knowledge for a topic or problem based on the attempt to locate one or more experts (block 513) from FIG. 5A. In searching for one or more experts, a search is made to locate a relevant virtual community within the identified network (block 523). If a virtual community is identified, the virtual community information is sent to the requesting mobile device or application (block 517), and a search is conducted within the virtual community for one or more experts (block 525). If one or more experts are identified in the virtual community information, by locating relevant user profiles for example, the information for the located experts are sent to the requesting mobile device or application (block 517).

Information is also searched that is related to the user sending the request to the enterprise server (block 521).

The user may have a profile within the master knowledge repository, and the user profile may help to fulfill the request. For example, the user profile may have information that the user has a certain level of experience or expertise that can help to better focus the search on specific results. For instance, the system may provide the user with greater amounts of located information if the user has little or no expertise or provide the user with lesser amounts located information if the user has a higher level of expertise. In the case of the user having little or no experience, the system may provide detailed search results, and in the case of the user having higher level of expertise, the search results may be provided in the format of a brief or summary.

Figure 6A:
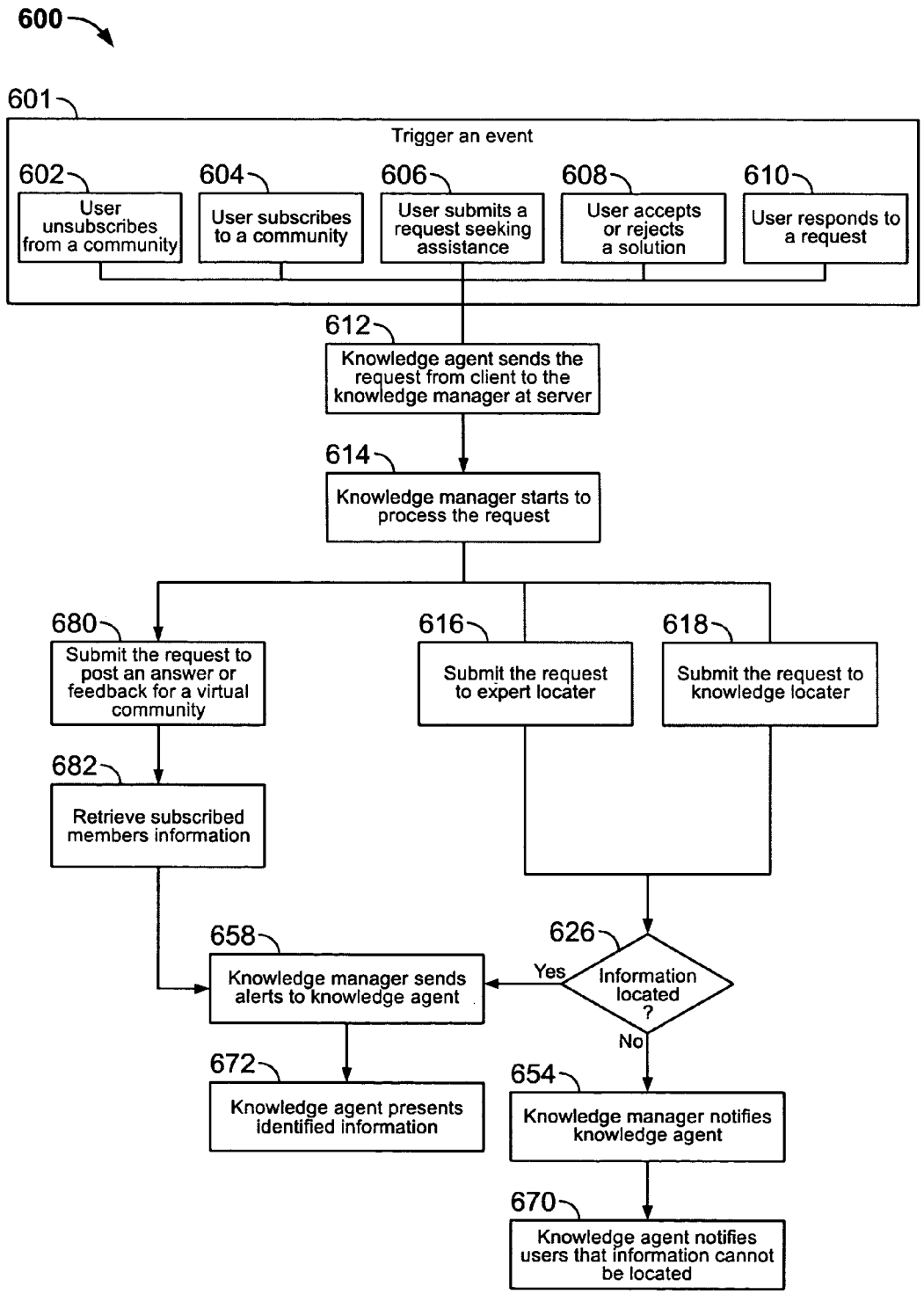
FIG. 6A shows a flow diagram for conducting a search for knowledge for a topic or problem.
Figure 6B:
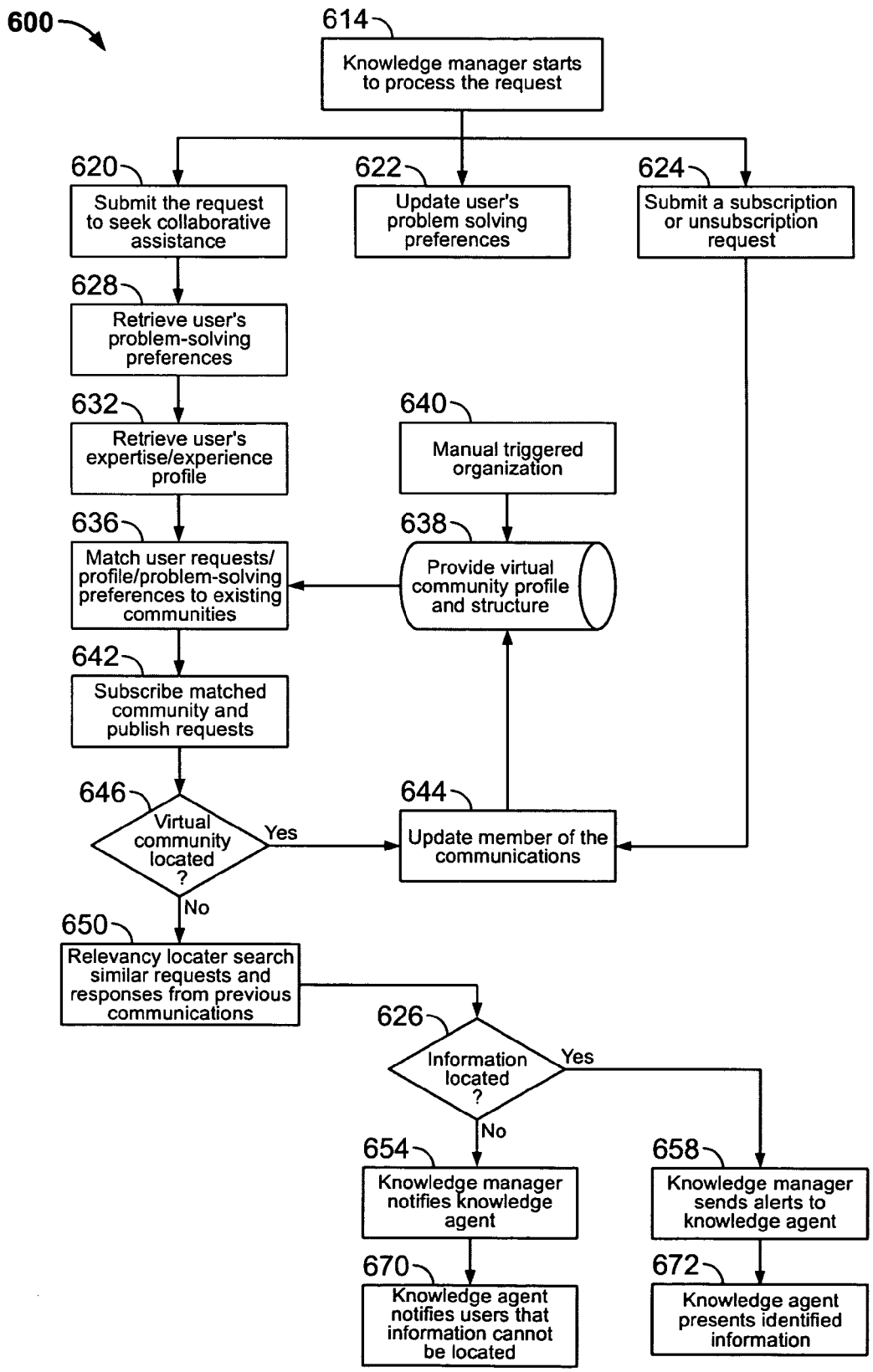
FIG. 6B shows the flow diagram from FIG. 6A for conducting a search for knowledge for a topic or problem.

FIGS. 6A-6B shows a flow diagram for conducting a search for knowledge for a topic or problem. As described in FIGS. 5A-5B, a user can trigger an event to send a request to the enterprise server for information for a topic or problem (block 601). The user may be on an application or a mobile (client) device that is external to the enterprise server. As shown in FIG. 6A, the triggering events can include having a user to unsubscribe from a virtual community (block 602), (e.g., unsubscribe when an expert discontinues employment the company), and subscribing an expert to a virtual community (block 604) (e.g., subscribe when a new expert is hired to the company). Other events can include when a user submits a request seeking assistance on a problem (block 606), when a user accepts or rejects a solution to a problem (block 608), and when a user responds to a request for assistance or a solution (block 610). A local knowledge agent module, residing in the mobile (client) device or application, interacts with a knowledge manager module in the enterprise server to send the request to the enterprise server (block 612) to begin the processing of the request (block 614). The enterprise server has a master knowledge repository that can include multiple knowledge networks relating to a corresponding problem or topic.

The request may be submitted to the expert locator (block 616) and/or the knowledge support locator (block 618). If the information is not located (block 626), the knowledge manager notifies the knowledge agent (block 654). The knowledge agent can notify the user that the requested information cannot be located (block 670). If the information is located (block 626), the knowledge manager notifies the knowledge agent on the client device (block 658), and the knowledge agent can present the relevant requested information to the user (block 672).

The request may also be submitted to post an answer or to provide feedback to a virtual community (block 680). For example, one or more members of the virtual community may respond to the request with an answer or feedback. The response can be posted or distributed so that other virtual community members can view the response and/or provide feedback or additional comments for the response. In posting the response, information may be retrieved from the master knowledge repository for one or more members of the virtual community (block 682). When the information is retrieved, the knowledge manager notifies the knowledge agent on the client device (block 658), and the knowledge agent can present the relevant requested information to the user (block 672).

As shown in FIG. 6B, the request from the knowledge manager (block 614) may be submitted for collaborative assistance to help locate the information from one or more information sources based on the user (block 620). In this aspect, knowledge search may be related to the user's profile, preferences, communications, role, and activities. The user's information may help in the search for an expert and may better define the user's request to the system for information. For example, the system may have a list or database of problem-solving preferences for a user, such as a user preference to first conduct searches for experts within a regional office location before searching for experts in other office locations. The user's problem-solving preferences may be retrieved (block 628), as well as retrieving a profile on the enterprise server that relates to the user's experience and expertise (block 632). For example, the user may have experience in servicing computers. If an expert is located that can solve the user's request, the request may be sent to the expert along with a profile of the user's computer experience background. In knowing the user's level of expertise for a problem, the expert can better know the level of detail that may be needed to answer the user's request.

The virtual community information can be provided (block 638) and the user's request, profile, and problem-solving preferences can be matched to the existing virtual community using one or more rules used to perform the matching (block 636). In one implementation, a decision model can match the user with a virtual community based on weighing one or more factors, such as experience, performance, and quality. In another implementation, the user may be added or subscribed to the identified virtual community when the user is matched to the virtual community (block 642). In this aspect, the request can be published to other members of the virtual community for collaborative problem-solving. If the virtual community is located (block 646), the user can be added as a member to the virtual community, and the user can be updated with the published communications on the virtual community (block 644), such as an electronic message board for the virtual community or relevant email. The relevant knowledge locator may also search for similar requests and responses from previous communications (block 650) in attempting to determine if the requested information has been located (block 626). Previous communications associated with the identified virtual community, the user, and/or other users of the system, may be archived in the enterprise server. The profile, organization, and structure of the virtual community may have additions or modifications that can be manually added or modified (block 640) using the archived requests and responses, the user's problem-solving preferences, and/or the user's profile.

If relevant information is not located (block 626), the knowledge manager notifies the knowledge agent (block 654). The knowledge agent can notify the user that the requested information cannot be located (block 670). If relevant information is located (block 626), the knowledge manager notifies the knowledge agent on the client device (block 658), and the knowledge agent presents the relevant requested information to the user (block 672).

In another aspect, if the triggering event can relate to a subscription or an unsubscription request (blocks 602, 604), the knowledge manager can process the request (block 614) by submitting the subscription or unsubscription request to update the virtual community information (blocks 644, 638). In another implementation, the triggering event may relate to a change in a user's problem-solving preferences (not shown). In this case, the knowledge manager can process the request to update for the user's problem-solving preferences (block 622).

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. In one implementation, a computer program product is tangibly embodied in an information carrier. The computer program product contains instructions that, when executed, perform a method, such as one of the methods described above. The information carrier is a computer- or machine-readable medium, such as memory, or a storage device.

To provide for interaction with a user, the systems and techniques described here can be implemented on one or more computers each having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. The components of the system can be interconnected by any form or medium of digital data communication (e.g., a communication network). Examples of communication networks include a local area network ("LAN"), a wide area network ("WAN"), a wireless local area network ("WLAN"), a personal area network ("PAN"), a mobile communication network using a multiple access technology (e.g., a cellular phone network with Code Division Multiple Access, "CDMA"), and the Internet.

The computing system can include clients and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. There may be other communication scenarios not described. For example, the evaluators 222, 228, 234 and identifiers 230, 224, 226, 232 in FIG. 2 can interact with each other in other ways than described, and are not limited to interact as the order shown. Other implementations may be within the scope of the following claims.

What is claimed is:

1. A computer program product tangibly embodied in a machine-readable medium, the computer program product including instructions that, when executed, perform a method to associate information for a virtual community of experts capable of solving a problem, the method comprising:
    creating a profile for an expert, the profile comprising information associated with any of an experience, a quality of work, and an efficiency of the expert;
    matching the expert profile with information associated with the virtual community, the matching being based upon the problem to be solved;
    associating the expert profile with the information for the virtual community;
    storing the information for the virtual community in a knowledge repository; and
    distributing the information for the virtual community, wherein the distributing comprises any of broadcasting the information, posting the information, and emailing the information.

2. A computer program product tangibly embodied in a machine-readable medium, the computer program product including instructions that, when executed, perform a method to associate information for a virtual community of experts capable of solving a problem, the method comprising:
    creating a profile for an expert, the profile comprising information associated with any of an experience, a quality of work, and an efficiency of the expert;
    matching the expert profile with information associated with the virtual community, the matching being based upon the problem to be solved;
    associating the expert profile with the information for the virtual community; and
    storing the information for the virtual community in a knowledge repository,
    wherein the information for the virtual community comprises contact information for the experts associated with the virtual community.

3. A computer program product tangibly embodied in a machine-readable medium, the computer program product including instructions that, when executed, perform a method to associate information for a virtual community of experts capable of solving a problem, the method comprising:
    creating a profile for an expert, the profile comprising information associated with any of an experience, a quality of work, and an efficiency of the expert;
    matching the expert profile with information associated with the virtual community, the matching being based upon the problem to be solved;
    associating the expert profile with the information for the virtual community; and
    storing the information for the virtual community in a knowledge repository,
    wherein the knowledge repository is configured to store information for a plurality of virtual communities.

4. A computer program product tangibly embodied in a machine-readable medium, the computer program product including instructions that, when executed, perform a method to associate information for a virtual community of experts capable of solving a problem, the method comprising:
    creating a profile for an expert, the profile comprising information associated with any of an experience, a quality of work, and an efficiency of the expert;
    matching the expert profile with information associated with the virtual community, the matching being based upon the problem to be solved;
    associating the expert profile with the information for the virtual community;
    storing the information for the virtual community in a knowledge repository; and providing the information for the virtual community for storage in a local knowledge repository on a client device.

5. A computer program product tangibly embodied in a machine-readable medium, the computer program product including instructions that, when executed, perform a method to associate information for a virtual community of experts capable of solving a problem, the method comprising:
creating a profile for an expert, the profile comprising information associated with any of an experience, a quality of work, and an efficiency of the expert;
matching the expert profile with information associated with the virtual community, the matching being based upon the problem to be solved;
associating the expert profile with the information for the virtual community;
storing the information for the virtual community in a knowledge repository; and
updating information for the virtual community based on a change of information for any one of the experts associated with the virtual community.

6. The product of claim 5, wherein virtual community information is updated based upon one or more triggering events.

7. The product of claim 6, wherein the one or more triggering events comprise any of the following: a user subscription to the virtual community; a user unsubscription to the virtual community; a user request for assistance; a user acceptance of a solution; a user rejection of a solution; and a user response to a request.

8. A computer program product tangibly embodied in a machine-readable medium, the computer program product including instructions that, when executed, perform a method to associate information for a virtual community of experts capable of solving a problem, the method comprising:
creating a profile for an expert, the profile comprising information associated with any of an experience, a quality of work, and an efficiency of the expert;
matching the expert profile with information associated with the virtual community, the matching being based upon the problem to be solved;
associating the expert profile with the information for the virtual community; and
storing the information for the virtual community in a knowledge repository,
receiving information for at least one member of the virtual community from a client device.

9. A computer program product tangibly embodied in a machine-readable medium, the computer program product including instructions that, when executed, perform a method to associate information for a virtual community of experts capable of solving a problem, the method comprising:
creating a profile for an expert, the profile comprising information associated with any of an experience, a quality of work, and an efficiency of the expert;
matching the expert profile with information associated with the virtual community, the matching being based upon the problem to be solved;
associating the expert profile with the information for the virtual community;
storing the information for the virtual community in a knowledge repository;
creating a profile of a client device user based on any of a problem-solving preference of the client device user, an experience level of the client device user, information received from the client device user, and a work history of the client device user;
determining whether the profile of the client device user is associated with the virtual community; and
upon determining that the client device user is associated with the virtual community, adding the profile of the client device user to the virtual community.

10. A system to generate information for a virtual community of experts for solving a problem, comprising:
a knowledge network that is based on the problem, the knowledge network including information associated with the virtual community, wherein the virtual community comprises information for one or more experts to solve the problem;
a server comprising a knowledge manager and a knowledge repository, wherein the knowledge manager is configured to interact with the knowledge repository to locate an expert, and wherein the knowledge repository is configured to store information for the knowledge network; and
information to be updated for the knowledge network by assigning information associated with the located expert with the information for the virtual community, wherein the knowledge repository is configured to store the updated knowledge network information,
wherein the knowledge network is configured to categorize the one or more experts to facilitate collaborative problem-solving by providing virtual community infonnation to the one or more experts.

11. A system to generate information for a virtual community of experts for solving a problem, comprising:
a knowledge network that is based on the problem, the knowledge network including information associated with the virtual community, wherein the virtual community comprises information for one or more experts to solve the problem;
a server comprising a knowledge manager and a knowledge repository, wherein the knowledge manager is configured to interact with the knowledge repository to locate an expert, and wherein the knowledge repository is configured to store information for the knowledge network; and
information to be updated for the knowledge network by assigning information associated with the located expert with the information for the virtual community, wherein the knowledge repository is configured to store the updated knowledge network information,
wherein the knowledge manager is further configured to locate the one or more experts for the virtual community at run-time.

12. A system to generate information for a virtual community of experts for solving a problem, comprising:
a knowledge network that is based on the problem, the knowledge network including information associated with the virtual community, wherein the virtual community comprises information for one or more experts to solve the problem;
a server comprising a knowledge manager and a knowledge repository, wherein the knowledge manager is configured to interact with the knowledge repository to locate an expert, and wherein the knowledge repository is configured to store information for the knowledge network; and
information to be updated for the knowledge network by assigning information associated with the located expert with the information for the virtual community, wherein the knowledge repository is configured to store the updated knowledge network information, wherein the knowledge manager is further configured to add information for one or more experts to the virtual community based on criteria for a previously-searched problem.

13. A system to generate information for a virtual community of experts for solving a problem, comprising:
- a knowledge network that is based on the problem, the knowledge network including information associated with the virtual community, wherein the virtual community comprises information for one or more experts to solve the problem;
- a server comprising a knowledge manager and a knowledge repository, wherein the knowledge manager is configured to interact with the knowledge repository to locate an expert, and wherein the knowledge repository is configured to store information for the knowledge network; and
- information to be updated for the knowledge network by assigning information associated with the located expert with the information for the virtual community, wherein the knowledge repository is configured to store the updated knowledge network information, wherein at least one mobile device is configured to interact with the knowledge manager.

14. A computer-implemented method to gather information for a virtual community of experts to address a problem area, the method comprising:
- identifying the problem area;
- searching for a virtual community within a master knowledge repository that is relevant to the problem area, wherein the master knowledge repository comprises information for one or more virtual communities; and
- if the relevant virtual community is not found, creating information for the virtual community that is relevant to the problem area comprising:
  - associating information for one or more experts of the problem area to the virtual community;
  - creating a profile for each of the experts based on the associated information; and
  - storing the profile for each of the experts within the master knowledge repository.

15. The method of claim 14, wherein if a relevant virtual community is found, the method further comprises associating the problem area with the relevant virtual community.

16. The method of claim 14, wherein the information for one or more experts of the problem area comprises associated information for at least one characteristic relating to the one or more experts.

17. The method of claim 16, wherein the at least one characteristic comprises one of a work experience, an evaluation of a quality of work, a level of expertise, and communications related to the problem area.

18. The method of claim 14, further comprising:
- receiving a request to solve a problem; and
- associating the request with information for the relevant virtual community.

* * * * *